(12) United States Patent
Voytenko

(10) Patent No.: US 11,041,479 B2
(45) Date of Patent: Jun. 22, 2021

(54) WIND ELECTRIC GENERATOR

(71) Applicant: Vyacheslav Nikolaevich Voytenko, St. Petersburg (RU)

(72) Inventor: Vyacheslav Nikolaevich Voytenko, St. Petersburg (RU)

( * ) Notice: Subject to any disclaimer, the term of this patent is extended or adjusted under 35 U.S.C. 154(b) by 0 days.

(21) Appl. No.: 16/981,375

(22) PCT Filed: Feb. 6, 2019

(86) PCT No.: PCT/RU2019/050010
§ 371 (c)(1),
(2) Date: Sep. 16, 2020

(87) PCT Pub. No.: WO2019/182478
PCT Pub. Date: Sep. 26, 2019

(65) Prior Publication Data
US 2021/0003113 A1    Jan. 7, 2021

(30) Foreign Application Priority Data
Mar. 19, 2018    (RU) .......................... RU2018109570

(51) Int. Cl.
*F03D 5/00* (2006.01)
*F03D 5/04* (2006.01)
(Continued)

(52) U.S. Cl.
CPC ................. *F03D 5/04* (2013.01); *F03D 7/00* (2013.01); *F03D 9/25* (2016.05); *F05B 2240/211* (2013.01)

(58) Field of Classification Search
CPC ..... F03D 5/04; F03D 7/00; F03D 9/25; F05B 2240/211
See application file for complete search history.

(56) References Cited

U.S. PATENT DOCUMENTS

| 1,953,444 A | 4/1934 | Stalker |
| 6,629,815 B2 | 10/2003 | Lusk |

(Continued)

FOREIGN PATENT DOCUMENTS

| EP | 22635 A1 | 1/1981 |
| EP | 2910775 A1 | 8/2015 |

(Continued)

OTHER PUBLICATIONS

Search report in PCT/RU2019/050010, dated May 16, 2019.

*Primary Examiner* — Julio C. Gonzalez
(74) *Attorney, Agent, or Firm* — Bardmesser Law Group

(57) ABSTRACT

Wind electric generator includes vertical posts attached to support surface, a closed loop rail above support surface, and coupled to vertical posts; sequentially interconnected cars coupled to rail by rollers; frame of each car coupled to first and second vertically-oriented wings; first wing mounted above rail; second wing mounted under rail; turning mechanism coupled to one wing for changing angular orientation relative to wind direction; generator mounted on each frame, having a shaft with a wheel, the wheel engaged to the rail; second rail track below the rail; additional sequentially interconnected cars on second rail track and hingedly coupled with lower end of second wing; and wherein turning mechanism is a flap generating aerodynamic force, coupled to first wing using tail beams; a drive for changing angular position of flap; first and second wings are rigidly coupled using vertical rod; and second wings hingedly coupled to cars on second rail.

15 Claims, 3 Drawing Sheets

(51) Int. Cl.
*F03D 9/25* (2016.01)
*F03D 7/00* (2006.01)

(56) References Cited

U.S. PATENT DOCUMENTS

| | | | |
|---|---|---|---|
| 8,053,919 B1 | 11/2011 | Sheth | |
| 2008/0157526 A1* | 7/2008 | Davison | F03D 13/20 290/3 |
| 2012/0066154 A1* | 3/2012 | Harrington | B61B 7/06 705/412 |

FOREIGN PATENT DOCUMENTS

| | | |
|---|---|---|
| SU | 1273640 A1 | 11/1986 |
| WO | 2015168178 A1 | 11/2015 |

* cited by examiner

WIND ELECTRIC GENERATOR

CROSS REFERENCE TO RELATED APPLICATIONS

This application is a US National Phase of PCT/RU2019/050010, filed on Feb. 6, 2019, which claims priority to Russian Patent Application No. 2018109570, filed on Mar. 19, 2018.

FIELD OF THE INVENTION

The invention relates to the field of wind power engineering, namely to the wind energy systems designed for conversion of wind energy to electric energy for power supply of different consumers.

CONVENTIONAL ART

Wind power generators that use cars with wings (elements receiving the wind energy) vertically fastened on them are known from RU2013135023, U.S. Pat. No. 4,756,666, EA201200932, where movement of the cars is limited in one direction by means of long guide track.

A device for generation of electric energy including the rail system (at least one rail) and the wings moved by means of air flow is described in US2016290317. The car is installed with possibility of rolling along the rails and is connected with the wings. Electric energy generation system includes two or more independent sets of stator windings on the rails and rotor (armature) moved by the car, wherein linear displacement in relation to the rotor windings generates the electric energy.

There is the known wind electric generator comprising vertically-aligned posts attached to the support surface, with which the rails forming the rail track of the closed loop at a height from the support surface are coupled, sequentially interconnected cars, each of which is coupled with the rail by means of rollers for movement along it, herewith the frame of each car is coupled with two vertically-aligned wings, one of which is mounted above the rail and the second one is mounted under the rail, wherein one of the wings is coupled with its turning mechanism for change of position of the wing in relation to the wind flow vector, and the generator with wheel on the shaft engaged with the rail surface is mounted on the car frame (EP2910775, published on 26 Aug. 2015). This publication is taken as a prototype.

An attribute of the known wind electric generator is that the car is located alongside of the rail and coupled with the rail by means of its rollers. Wings above and under this car are also located alongside of this rail. Thus, there is a console suspension of the car to the rail. Since the car together with generator and control system and wings have a certain weight, then there is a torque moment compensated by the fact that the second nearby rail is located under the main rail and the car is coupled with this other rail by means of other wheels. It means that the car is of double-support type with separation of support points.

However, there is also a moment from a wind load acting on wings leading to their twisting in relation to the car. As a result, wings are constantly in a swinging position and these swings are transferred to the car being under alternate loads in the points of contact of its wheels with these two rails. This decreases durability of the car and overloads its undercarriage. This is also due to the fact that there are no hinge connections between the rail and the wings, in the points of which the vibration transmission suppression could take place. Since there are enough wing systems on the rail track, the fluctuation resonance transferred to the entire rail system occurs periodically. Such systems operate at the limits of strength characteristics.

If one looks at attachment of the car, it becomes obvious that the car braces the rails with a pair of runner blocks, each of which has one wheel with concave running track located above the rail (in the form of a tube), and the other one, with the same design, located under the rail. However, each such wheel is mounted on the axis with its end welded to the runner block wall. In case of such console attachment of the wheels, the entire load is concentrated in the welding point of axle to the runner block frame.

It is known in the prior art that welding points are stress concentrators (due to change of metal structure as a result of heating). That is why such points do not work very well with alternate loads and disruption of structural bonds occurs in such points causing breakage of the axle.

SUMMARY OF THE INVENTION

One object of the present invention is to increase of reliability through removal of alternate loads and their transfer to the second runner block coupled with the lower wing by means of hinge connections.

The indicated technical result is achieved by the fact that the wind electric generator comprising vertically-aligned posts attached to the support surface, with which the rail forming the rail track of the closed loop at a height from the support surface is coupled, sequentially interconnected cars, each of which is coupled with the rail by means of rollers for movement along it, herewith the frame of each car is coupled with two vertically-aligned wings, one of which is mounted above the rail and the second one is mounted under the rail, wherein one of the wings is coupled with its turning mechanism for change of position of the wing in relation to the wind flow vector.

The generator with wheel on the shaft engaged with the rail surface is mounted on the car frame. The additional rail track is mounted below the level of rail position, where the additional sequentially interconnected cars are located, each of which is hingedly coupled with lower end of the wing located below the level of rails of the top rail track, and the turning mechanism for change of top wing position in relation to the wind flow vector is a flap in the form of plate or wing of aerodynamic profile coupled with the wing located under the rails of the top rail track by means of tail beams and equipped with drive for change of installation angle of the flap. The wing under the top rail is hingedly coupled with the car for provision of its turning around the vertical axis, and the bottom wing is rigidly coupled with the wing turning axis under the top rail, wherein the said wing turning axis is located on the frame hingedly coupled with the car runner block.

The present invention is explained by the specific embodiment which, however, is not the only one possible, but illustrates the possibility of achievement of the necessary technical result.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

Reference will now be made in detail to the embodiments of the present invention, examples of which are illustrated in the accompanying drawings.

According to the present invention, new design of the wind electric generator using a wind flow pressure as a moving force driving the wings kinematically coupled with the generators contacting with one of the rails used as a busbar.

In general the wind electric generator comprises vertically-aligned posts attached to the support surface, with which the rails forming the rail track of the closed loop at a height from the support surface are coupled. However, two rail tracks are mounted on these posts one below the other. There are sequentially interconnected base cars on the upper rail track, each of which is coupled with the rail of this track by means of rollers for movement along it.

Frame of each car is coupled with two vertically-aligned wings, one of which is mounted above the rail and the second one is mounted under the rail, wherein one of the wings is coupled with its turning mechanism for change of position of the wing in relation to the wind flow vector. Moreover, the generator with wheel on the shaft engaged with surface of the rail considered as a busbar is mounted on the car frame.

The second (additional) rail track is mounted below the level of upper rail position, where the other (additional) sequentially interconnected cars are located, each of which is hingedly coupled with lower end of the wing located below the level of rails of the top rail track.

The wing under the top rail is hingedly coupled with the car for provision of its turning around the vertical axis, and the bottom wing is rigidly coupled with the wing turning axis under the top rail, wherein the said wing turning axis is located on the frame hingedly coupled with the car runner block.

The turning mechanism for change of top wing position in relation to the wind flow vector is a flap in the form of plate or wing of aerodynamic profile coupled with the wing located under the rails of the top rail track by means of tail beams and equipped with drive for change of angular position of the flap.

The example of the specific embodiment of the invention is described below.

The wind load plant is designed for conversion of wind energy to electric energy. The plant differs from horizontal and vertical plants of the same object by availability of straight portions of wing movement. The plant consists of structural sections in the form of posts attached to the foundation in the support surface, rail track with straight portions, turns and track switches, and rolling cars with wings, motor-wheels-generators and other equipment installed thereon.

Figure 1:
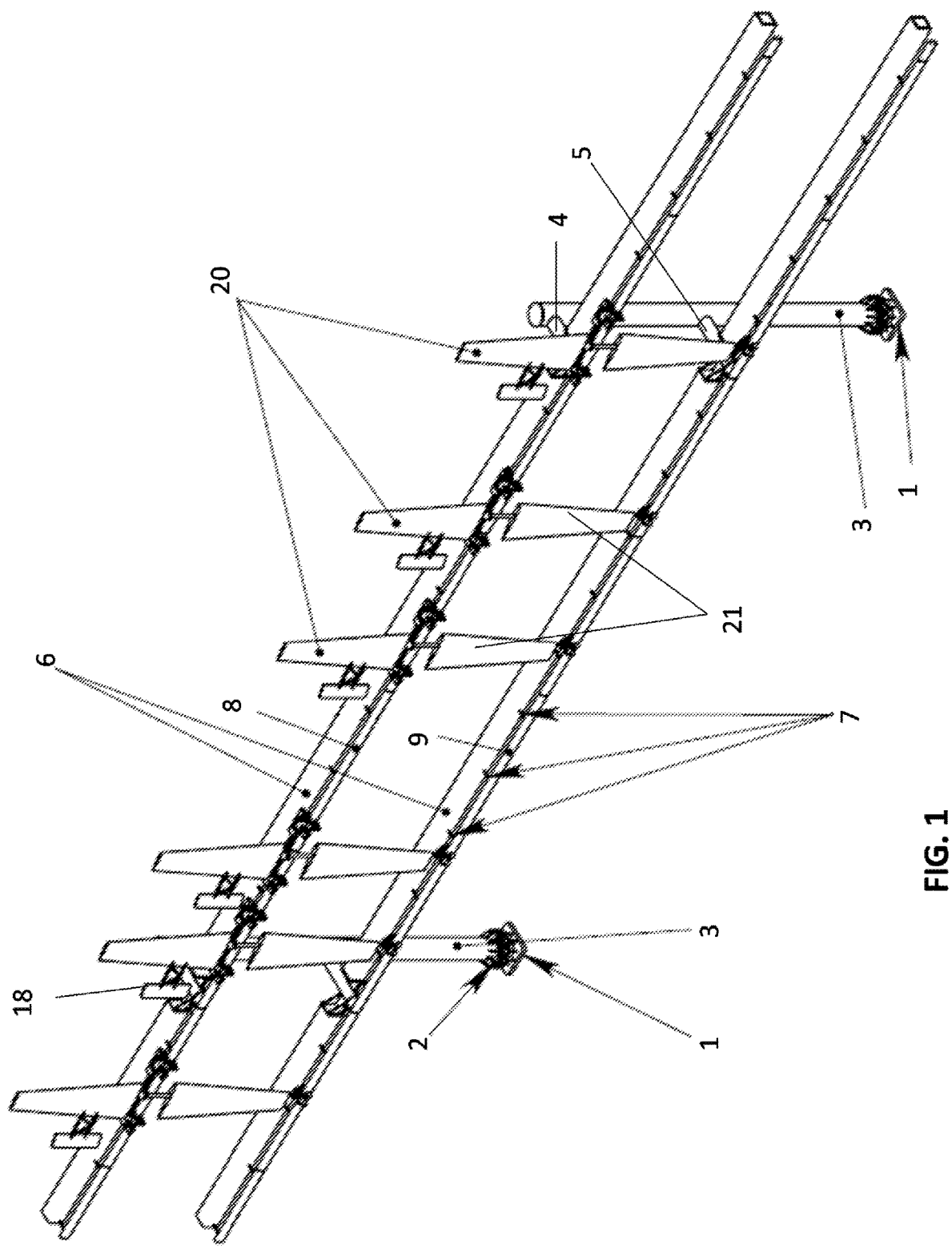
FIG. 1 is a perspective view of the wind electric generator.
Figure 2:
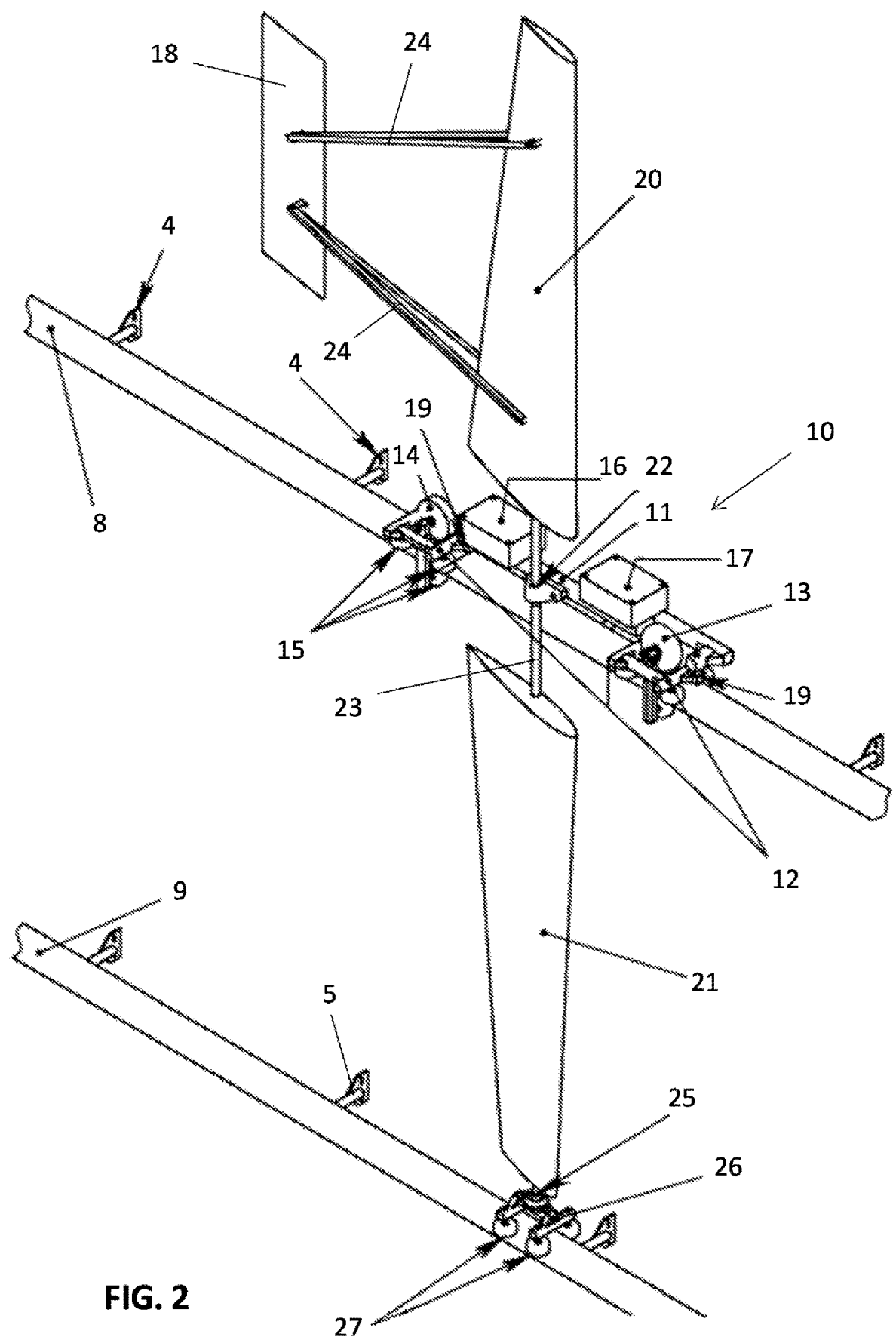
FIG. 2 shows wings on cars.

Depending on the bottom soil, foundation 1 may be of post type made of cast or prefabricated reinforced concrete, pile type with concrete or metal piles, with framework on piles 2. The anchors may be provided for attachment of structural sections to foundation. Description of foundation is only an example. Foundation is designed for attachment of support elements made in the form of posts 3. These vertically-aligned posts 3 consist of supports installed on the foundation. Each of these supports bears two consoles 4 and 5 at different height. These consoles are attached to horizontal bearing beams 6 at different height, to which rails 8 and 9 forming the closed loops of two rail tracks mounted at different height in vertical direction are attached by means of fastening beams 7 (FIG. 1). Moreover, there are turning portions, track switching and turning mechanisms depending on configuration of the closed loop of rail tracks.

In order to ensure repetition of motion, the track shall have the form of polyhedron, corners of which include portions of radial arc to ensure movement of cars from one edge to another. However, edges are significantly shorter than straight portions. Alternatively, the track shall be a combination of closed "loops" consisting of parallel tracks connected in semi-circumferences, wherein diameter of circumference is significantly less than the length of straight portions. For example, the closed loop may be rectangular or triangular in the plan with turning rounds when transferring from one straight line to another. Alternatively, it may be made of multiple loops. Transfer from one loop to another is performed by means of track switching mechanisms.

Rail tracks are located in parallel in vertical direction. Each rail track consists of a rail in the form of a guide made of metal rectangular pipe (hereinafter referred to as the rails). In order to ensure smooth movement of cars 10 along rails 8, rail bars are welded with one another using butt weld. Rail track beam has expansion clearances across distances exceeding ones between the supports. The busbar, through which electric energy is received from the rolling car or transferred to the rolling car, is attached to one of the rail.

Car 10 moving along rails 9 of upper rail track consists of a bearing beam or frame 11 of the car 10, two wheeled bearing runner blocks 12 moving along the upper rail, motor-wheel-generator or just generator 13 carrying the wheel for contact with the rail, bearing wheel 14 resting on top of the rail, guiding wheels 15 bracing the rail from several sides, battery 16 and unit 17 of control system for motor-wheel-generator or generator and adjustable flap 18. Bearing beam 11 or frame of car 10 is coupled with runner blocks by means of hinges 19 ensuring removal of dynamic loads occurring in the runner blocks as a result of movement along the rail under the influence of overturning moment from weight and alternate loads received from wings 20 and 21 from the frame.

Axis 23 installed with the possibility to turn or rotate around the vertical axis is hingedly coupled with bearing beam or frame 11 of the car 10 via attachment fitting 22. This axis is connected to upper wing 20 located above the level of rail 8 and lower wing 21 located below the level of rail 8 of upper rail track. Upper wing 20 is equipped with flap 18 and the lower wing 21 has no flap.

Wing with adjustable flap 18 is a wing of symmetrical or asymmetrical aerodynamic profile. It may be made of composite materials or enclosed metal framing. Controllable adjustable flap 18 is attached to the wing by means of tail beams 24. Flap may be an aerodynamic profile or plate turning on a hinge driven by stepped or other motor. The flap is designed for changing of wing turning angle in relation to actual wind. The operating principle of the flap is the same as the operating principle of horizontal tail plane: when turning angle of the horizontal tail is changed, pitching angle of the aircraft is changed in such a way that the moment from carrying power on the lifting wing compensates the moment occurred from aerodynamic force on horizontal tail. This allows changing of position of main operating element of the wind electric generator, that is the wing, in relation to approach wind flow by changing the flap turning angle.

Wing 21 without the flap is a wing of symmetrical or asymmetrical aerodynamic profile made of composite materials or enclosed metal framing. The wing is rigidly connected with the wing 20 with adjustable flap 18 using axis 23 in the form of a rod.

The fitting for attachment of wings to bearing beam is a hinge allowing free turning of the wings in relation to the car frame.

The bearing runner block is designed for the car movement along the upper rail of the rail track and for passing of curves of the rail track. The bearing runner block is attached to the bearing frame by means of turning hinge. Wheels are attached to the bearing runner block on the top, on the bottom, on the right and on the left. Guiding wheels are located on each runner block on the sides and on the bottom. There is receiving mass load on the top of one of the runner blocks and motor-wheel-generator receiving mass load and ensuring acceleration, braking and conversion of mechanical energy of the car into electric energy on the other one. It is possible to attach just a generator instead of motor-wheel-generator.

Bottom wing 21 is coupled with the (additional) runner block of car 26 by means of hinges 25 in its lower part for compensation of moment on the wing when moving along the lower rail. This runner block is designed for compensation of overturning moment occurred on wing 21. It is a structure, to which guiding wheels 27 are attached on the sides. The runner block is attached to the wing axis without a flap by means of a hinge.

Figure 3:
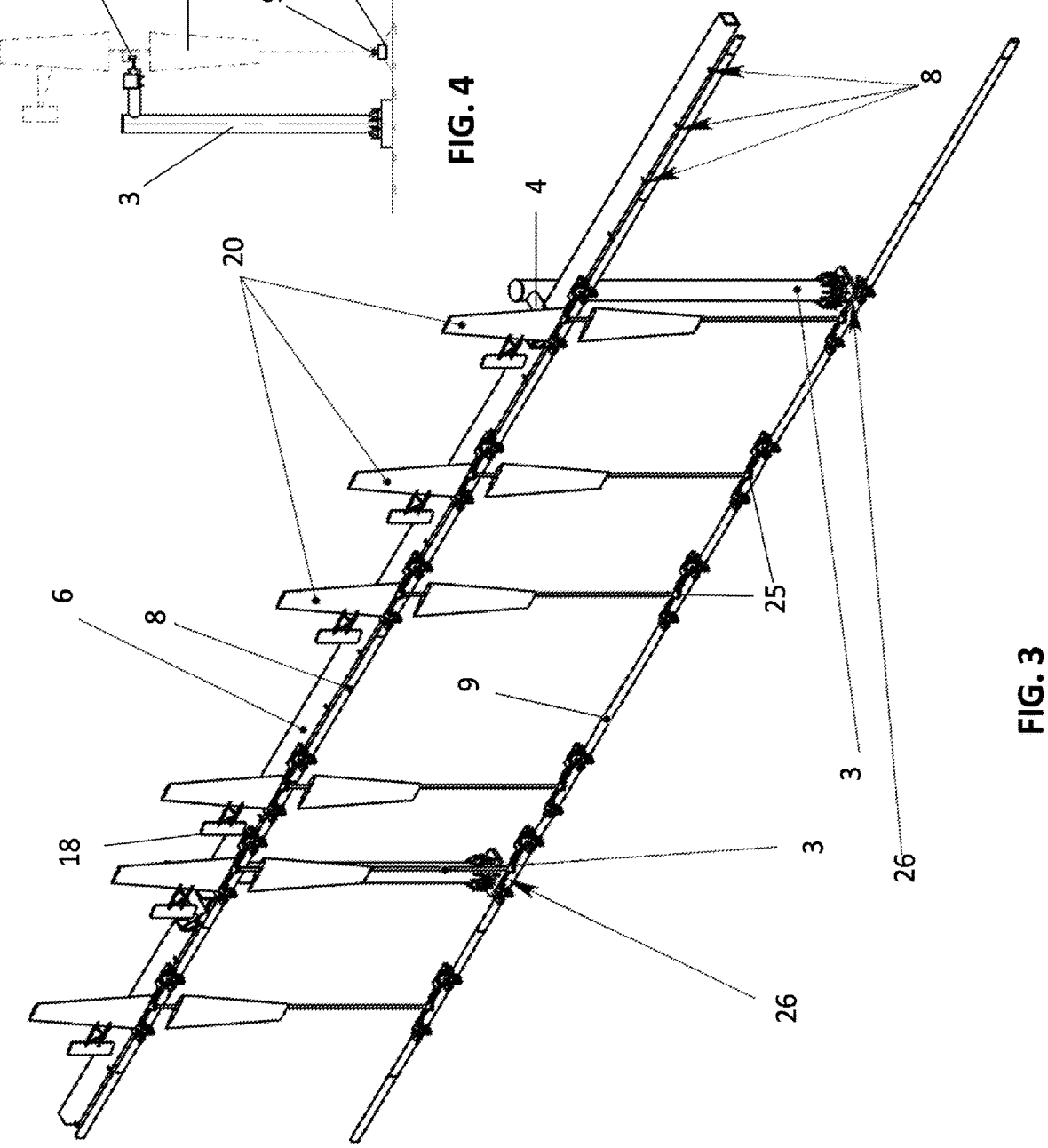
FIGS. 3-4 show the wind electric generator when the lower rail is attached to the support surface.
Figure 4:
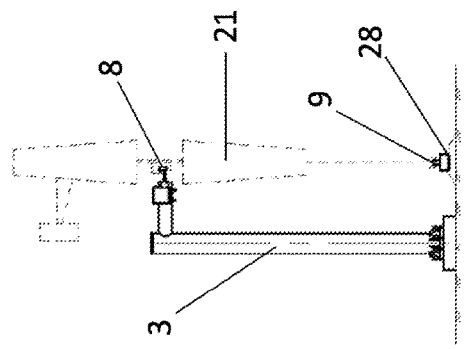

Lower rail 9 may be attached to the support surface by means of base 28 (FIGS. 3-4) which can be represented by: mount with sleepers, pile or strip foundation, special reinforced excavation.

Control system for motor-wheel-generator and adjustable flap, battery, current collector/transmitter are electric parts of the car. Additional equipment, such as mechanical brake, automatic coupling, meteorological sensors etc. may be installed on the car.

Main attributes of the plant are:

Use of aerodynamically clean body, in the form of a wing, designed for generation of carrying power for conversion of air (wind) flow energy into translational motion energy of the car.

Use of additional rail track for compensation of forces occurred on the wing in the direction perpendicular to motion. This allows use of the structure at winds in wide range of directions in relation to the track direction.

Availability of long straight section of the rail track allowing: first, obtaining of portion with stable motion, where wind (air) flow characteristics do not change, which will ensure constant speed at constant exposure decreasing vibrations and noise in the structure; second, since motion take place in plane, it will become plane-parallel resulting in significant simplification of the wing geometry.

Two wings shall be installed on one car: one is above the main car, the other one is below it. This will ensure reduction of load on guides, because such arrangement reduces the moment trying to turn the structure around the guide.

Rail track consists of two guides arranged vertically, e.g., guides on elevated road are attached to the supports one above the other. This allows lifting of wings above the surface boundary layer and increasing of efficiency of wind flow use. Vertical arrangement of guides allows increasing of "track gage" and decreasing of loads, since if the said moment occurs, the forces of interaction between rollers and guides will be inversely related to the distance between the track guides.

The design provides a possibility to change position of the wings in relation to the car in order to ensure optimal characteristics of the motor (generator). There is a possibility to control turning of the wing around the vertical axis in order to ensure optimal incidence angle.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

The invention claimed is:

1. A wind electric generator comprising:
   vertically-aligned posts attached to a support surface;
   a first rail coupled to the vertically-aligned posts and forming a closed loop above the support surface;
   sequentially interconnected cars, each coupled to an outer surface of the first rail by first and second rollers, for movement along the first rail;
   each car including
   (a) a frame;
   (b) first and second vertically-oriented wings hingedly coupled to the frame,
   (c) the first wing mounted above the first rail;
   (d) the second wing is mounted under the first rail;
   (e) a turning mechanism for changing an orientation of the wing relative to wind direction, wherein the turning mechanism is a flap shaped to generate aerodynamic force, the flap coupled to the first wing using tail beams;
   (f) a generator mounted on the frame above the first rail, the generator including a shaft coupled to the first roller, wherein the first roller functions as a rotor of the generator;
   (g) the first wing rigidly coupled to the second wing using a vertical rod, and
   (h) a drive for changing an orientation of the flap;
   a second rail below the first rail;
   additional sequentially interconnected cars each coupled to the second rail by at least two rollers on opposite sides of the second rail, for movement along the second rail; and
   each of the additional cars hingedly coupled to a lower end of a corresponding second wing such that an axis of rotation of the second wing passes through the corresponding additional car.

2. The wind electric generator of claim 1, wherein the second rail is offset horizontally from the first rail.

3. The wind electric generator of claim 1, wherein the additional sequentially interconnected cars are each coupled to the second rail by two additional rollers on the opposite sides of the second rail.

4. The wind electric generator of claim 1, wherein each of the sequentially interconnected cars is coupled to vertical surfaces of the first rail by two additional rollers.

5. The wind electric generator of claim 1, wherein the flap rotates the first and second wing without rotating the frame.

6. The wind electric generator of claim 1, further comprising a track switching mechanism for directing the cars to a second loop.

7. The wind electric generator of claim 1, wherein the sequentially interconnected cars are variably spaced along the first rail.

8. A wind electric generator comprising:
a first rail forming a closed loop;
a first plurality of cars coupled to an upper surface of the first rail using first and second rollers;
each of the first plurality of cars including
  (a) a frame;
  (b) a first wing mounted above the first rail and hingedly coupled to the frame;
  (c) a second wing mounted below the first rail and hingedly coupled to the frame;
  (d) a vertical rod that rigidly couples the first wing to the second wing;
  (e) a flap coupled to the first wing and shaped to generate aerodynamic force, for changing an orientation of the first and second wings relative to wind direction;
  (f) a drive for changing an orientation of the flap; and
  (g) a generator mounted on the frame above the first rail, the generator including a shaft coupled to the first roller, wherein the first roller functions as a rotor of the generator;
a second rail below the first rail;
a second plurality of cars, each coupled to the second rail by at least two coaxial rollers for movement along the second rail; and
each of the second plurality of cars hingedly coupled to a lower end of a corresponding second wing such that an axis of rotation of the second wing passes through the corresponding car.

9. The wind electric generator of claim 8, wherein the second rail is offset horizontally from the first rail.

10. The wind electric generator of claim 8, wherein each of the second plurality of cars is coupled to the second rail by two additional rollers on the opposite sides of the second rail.

11. The wind electric generator of claim 8, wherein each of the first plurality of cars is coupled to vertical surfaces of the first rail by two additional rollers.

12. The wind electric generator of claim 8, wherein the flap rotates the first and second wing without rotating the frame.

13. The wind electric generator of claim 8, further comprising a track switching mechanism for directing the cars to a second loop.

14. The wind electric generator of claim 8, wherein the cars of the first plurality of cars are variably spaced along the first rail.

15. A wind electric generator comprising:
a first rail forming a closed loop;
a first plurality of cars coupled to an outer surface of the first rail using first and second wheels;
each of the first plurality of cars including
  (a) a frame;
  (b) a first wing mounted above the first rail and rotationally coupled to the frame;
  (c) a second wing mounted below the first rail and rotationally coupled to the frame;
  (d) a vertical rod that rigidly couples the first wing to the second wing;
  (e) an aerodynamic flap coupled to the first wing for changing an orientation of the first wing;
  (f) a drive for changing an orientation of the flap; and
  (g) a generator mounted on the frame above the first rail, wherein the first wheel functions as a rotor of the generator;
a second rail below the first rail;
a second plurality of cars, each coupled to the second rail by at least two coaxial wheels for movement along the second rail; and
each of the second plurality of cars rotationally coupled to a lower end of a corresponding second wing such that an axis of rotation of the corresponding second wing passes through the car.

* * * * *